(12) United States Patent
Vickery et al.

(10) Patent No.: US 8,701,594 B2
(45) Date of Patent: Apr. 22, 2014

(54) WEIGHTED RODENT BAIT STATIONS AND RELATED METHODS

(75) Inventors: Ethan Vickery, Colleyville, TX (US); Larry Covington, Weatherford, TX (US)

(73) Assignee: VM Products, Inc., Bedford, TX (US)

( * ) Notice: Subject to any disclaimer, the term of this patent is extended or adjusted under 35 U.S.C. 154(b) by 43 days.

(21) Appl. No.: 13/062,915

(22) PCT Filed: Sep. 8, 2009

(86) PCT No.: PCT/US2009/056246
§ 371 (c)(1),
(2), (4) Date: Jun. 23, 2011

(87) PCT Pub. No.: WO2010/028378
PCT Pub. Date: Mar. 11, 2010

(65) Prior Publication Data
US 2011/0247955 A1 Oct. 13, 2011

Related U.S. Application Data

(60) Provisional application No. 61/095,251, filed on Sep. 8, 2008.

(51) Int. Cl.
*A01M 27/00* (2006.01)
(52) U.S. Cl.
USPC .......................................... 119/51.01; 43/131
(58) Field of Classification Search
USPC ..................... 119/51.01; 43/131, 55, 54.1, 58
See application file for complete search history.

(56) References Cited

U.S. PATENT DOCUMENTS

| | | | |
|---|---|---|---|
| 524,894 A | 8/1894 | Forsberg | 482/85 |
| 5,987,811 A | 2/1898 | Wiesener et al. | 43/131 |
| 759,030 A | 5/1904 | Sheaffer | 43/131 |
| RE14,782 E | 12/1919 | Hedrich et al. | 43/131 |
| 1,443,287 A | 1/1923 | Snyder et al. | 43/131 |
| 1,729,389 A | 9/1929 | Hughett | 43/131 |
| 2,569,833 A | 10/1951 | Simpson | 43/100 |
| 2,736,127 A | 1/1953 | McCann | 43/131 |
| 2,784,577 A | 9/1955 | Beaham | 248/146 |
| 2,750,707 A | 6/1956 | Ekstedt | 43/131 |
| 2,896,361 A | 6/1957 | Allen | 43/131 |
| 2,837,861 A | 6/1958 | Graham | 43/131 |
| 2,953,868 A | 10/1959 | Chambers | 43/131 |
| 2,950,562 A | 8/1960 | Lothrop | 43/102 |
| 3,271,894 A | 9/1966 | Manno et al. | 43/65 |
| 3,303,600 A | 2/1967 | Freeman | 43/131 |

(Continued)

FOREIGN PATENT DOCUMENTS

DE  3140658 A1  4/1983
DE  10207916 C1  4/2003

(Continued)

OTHER PUBLICATIONS

"Protecta Mouse Bait Station Features," RTU Mouse Bait Stations, hap://www.rodentcontrols.corn/mouse-bait-statiorts-rtu.htm, published Jun. 2004.

(Continued)

*Primary Examiner* — Yvonne Abbott
(74) *Attorney, Agent, or Firm* — Fulbright & Jaworski, LLP (57) ABSTRACT

Rodent bait station assemblies and methods for bundling.

20 Claims, 7 Drawing Sheets

(56) References Cited

U.S. PATENT DOCUMENTS

| | | | |
|---|---|---|---|
| 3,318,039 A | 5/1967 | MacDonald | 43/100 |
| 3,319,373 A | 5/1967 | Gale el al. | 43/100 |
| 3,343,744 A | 9/1967 | Morell et al. | 229/143 |
| 3,427,743 A | 2/1969 | Brunner et al. | 43/131 |
| 3,471,114 A | 10/1969 | Ball | 248/346.03 |
| 3,488,879 A | 1/1970 | Laughlin | 43/131 |
| 3,704,539 A | 12/1972 | Alvarez | 43/131 |
| 3,708,905 A | 1/1973 | Jalbert | 43/100 |
| D227,653 S | 7/1973 | Torchia | D22/19 |
| 3,821,861 A | 7/1974 | Jalbert | 43/65 |
| 3,978,607 A | 9/1976 | Piere | 43/131 |
| 3,992,804 A | 11/1976 | Senese | 43/100 |
| 4,026,064 A | 5/1977 | Baker | 43/131 |
| 4,030,230 A | 6/1977 | Souza | 43/81 |
| 4,182,070 A | 1/1980 | Connelly | |
| 4,208,829 A | 6/1980 | Manning | 43/131 |
| 4,216,640 A | 8/1980 | Kaufman | 53/556 |
| 4,226,042 A | 10/1980 | Gilbert | 43/96 |
| 4,270,299 A | 6/1981 | Long | 43/58 |
| 4,277,907 A | 7/1981 | Ernest | 43/131 |
| 4,349,982 A | 9/1982 | Sherman | 43/131 |
| 4,387,552 A | 6/1983 | Lancaster | 53/556 |
| 4,398,643 A | 8/1983 | Conlon | 248/500 |
| 4,400,904 A * | 8/1983 | Baker | 43/131 |
| 4,407,427 A | 10/1983 | Reuter | 220/339 |
| D271,231 S | 11/1983 | Stout | D22/122 |
| 4,418,493 A | 12/1983 | Jordan | 43/67 |
| 4,438,606 A | 3/1984 | Chardon et al. | 52/79.1 |
| 4,453,337 A | 6/1984 | Williams | 43/131 |
| 4,485,582 A | 12/1984 | Morris | 43/131 |
| 4,486,973 A | 12/1984 | Faucillon | 43/100 |
| 4,521,987 A | 6/1985 | Knote | 43/131 |
| 4,526,367 A | 7/1985 | Haston et al. | 473/483 |
| 4,541,198 A | 9/1985 | Sherman | 43/131 |
| D281,231 S | 11/1985 | Cochran | D9/456 |
| 4,570,377 A | 2/1986 | Primavera | 43/131 |
| 4,574,519 A | 3/1986 | Eckebrecht | 43/81 |
| 4,611,426 A | 9/1986 | Willis | 43/131 |
| 4,619,071 A | 10/1986 | Willis | 43/131 |
| 4,648,201 A | 3/1987 | Sherman | 43/131 |
| 4,660,320 A | 4/1987 | Baker | 43/131 |
| 4,730,411 A | 3/1988 | Katis | 43/105 |
| 4,730,412 A | 3/1988 | Sherman | 43/131 |
| 4,753,032 A | 6/1988 | Sherman | 43/131 |
| 4,765,579 A | 8/1988 | Robbins, III et al. | 248/101 |
| 4,833,819 A | 5/1989 | Sherman | 43/131 |
| 4,835,902 A | 6/1989 | Sherman | 43/131 |
| 4,870,780 A | 10/1989 | Sherman | 43/131 |
| 4,872,582 A | 10/1989 | Sipple | 220/1 T |
| 4,874,103 A | 10/1989 | Quisenberry et al. | 220/254.3 |
| 4,905,407 A | 3/1990 | Sherman | 43/131 |
| 5,004,114 A | 4/1991 | Terbrusch et al. | 220/296 |
| 5,014,943 A | 5/1991 | Nelson et al. | 248/99 |
| 5,038,516 A | 8/1991 | Doucette | 43/131 |
| 5,040,327 A | 8/1991 | Stack et al. | 43/131 |
| 5,085,030 A | 2/1992 | Segawa et al. | 53/399 |
| 5,105,972 A | 4/1992 | Waterston et al. | 220/603 |
| 5,131,184 A | 7/1992 | Harrison | 43/100 |
| 5,136,803 A | 8/1992 | Sykes et al. | 43/131 |
| 5,150,810 A | 9/1992 | Loebbert | 383/33 |
| 5,152,420 A | 10/1992 | Bird et al. | 220/600 |
| 5,174,462 A | 12/1992 | Hames | 220/87.1 |
| 5,184,836 A | 2/1993 | Andrews, Jr. et al. | 280/79.5 |
| 5,272,832 A | 12/1993 | Marshall et al. | 43/131 |
| 5,295,607 A | 3/1994 | Chang | 220/407 |
| D354,690 S | 1/1995 | Butler et al. | D10/46 |
| 5,379,545 A | 1/1995 | Gall | 43/124 |
| 5,385,258 A | 1/1995 | Sutherlin | 220/339 |
| 5,405,041 A | 4/1995 | Van Brackle | 220/495.07 |
| 5,419,453 A | 5/1995 | Lochridge | 220/404 |
| 5,445,110 A * | 8/1995 | Birnie | 119/61.5 |
| 5,446,992 A | 9/1995 | Stewart | 43/131 |
| 5,448,852 A | 9/1995 | Spragins et al. | 43/131 |
| 5,458,259 A | 10/1995 | Falk | 221/22 |
| 5,503,292 A | 4/1996 | Cuccharia | 220/407 |
| 5,513,465 A | 5/1996 | Demarest et al. | 43/113 |
| 5,549,214 A | 8/1996 | Harris | 220/339 |
| D374,704 S | 10/1996 | Rimback | D22/122 |
| 5,806,237 A | 9/1998 | Nelson et al. | 43/131 |
| 5,839,220 A | 11/1998 | Wass | 43/105 |
| 5,848,692 A | 12/1998 | Thorne et al. | 206/366 |
| 5,873,193 A | 2/1999 | Jensen | 43/131 |
| 5,897,018 A | 4/1999 | Pruitt | 220/603 |
| 5,943,814 A | 8/1999 | Bartlett, Jr. | 43/104 |
| 5,953,853 A | 9/1999 | Kim | 43/98 |
| 5,966,863 A | 10/1999 | Payton et al. | 43/131 |
| 6,050,419 A * | 4/2000 | Flanagan et al. | 206/597 |
| 6,058,646 A | 5/2000 | Bisoff et al. | 43/131 |
| 6,082,042 A | 7/2000 | Issitt | 43/131 |
| 6,152,305 A * | 11/2000 | Green | 206/764 |
| 6,155,002 A | 12/2000 | Holder | 43/115 |
| 6,158,166 A | 12/2000 | Snell et al. | 43/131 |
| 6,216,384 B1 * | 4/2001 | Dickson et al. | 43/131 |
| 6,219,960 B1 | 4/2001 | Contadini et al. | 43/121 |
| 6,234,339 B1 | 5/2001 | Thomas | 220/495.07 |
| 6,247,592 B1 | 6/2001 | Racicot et al. | 206/366 |
| 6,267,079 B1 | 7/2001 | Eby | 119/226 |
| 6,378,243 B1 | 4/2002 | Snell et al. | 43/131 |
| 6,397,517 B1 | 6/2002 | Leyerle et al. | 43/131 |
| 6,401,384 B1 | 6/2002 | Contadini et al. | 43/132.1 |
| 6,446,930 B1 * | 9/2002 | Li | 248/519 |
| 6,470,622 B1 | 10/2002 | Braun | 43/131 |
| 6,474,016 B2 | 11/2002 | Snell et al. | 43/131 |
| 6,493,988 B1 | 12/2002 | Johnson | 43/131 |
| 6,508,337 B1 | 1/2003 | Esper | 188/71.5 |
| 6,508,377 B1 * | 1/2003 | Griswold et al. | 220/495.06 |
| 6,511,033 B2 | 1/2003 | Li | 248/519 |
| 6,513,281 B2 | 2/2003 | Roberts | 43/109 |
| 6,513,283 B1 * | 2/2003 | Crossen | 43/131 |
| 6,618,983 B1 | 9/2003 | Spragins | 43/107 |
| 6,637,717 B2 | 10/2003 | Li | 248/519 |
| 6,644,493 B1 | 11/2003 | Walton et al. | 220/603 |
| 6,671,999 B1 | 1/2004 | Doucette | 43/131 |
| 6,672,000 B2 | 1/2004 | Aesch, Jr. | 43/132.1 |
| D486,203 S | 2/2004 | Stephen | D22/122 |
| 6,718,687 B2 | 4/2004 | Robison | 43/114 |
| 6,722,080 B2 | 4/2004 | Carter | 43/107 |
| 6,725,627 B2 | 4/2004 | Weder et al. | 53/399 |
| 6,729,067 B2 | 5/2004 | Lund et al. | 43/131 |
| 6,775,595 B1 | 8/2004 | Yabutani et al. | 700/291 |
| 6,786,349 B2 | 9/2004 | Najd | 220/484 |
| 6,789,351 B2 | 9/2004 | Chrestman | 43/122 |
| 6,792,713 B2 | 9/2004 | Snell | 43/124 |
| 6,807,768 B2 | 10/2004 | Johnson et al. | 43/131 |
| D498,286 S | 11/2004 | Loerakker et al. | D22/122 |
| 6,860,062 B2 | 3/2005 | Spragins | 43/121 |
| 6,874,274 B2 | 4/2005 | Townsend | 43/131 |
| 6,901,694 B1 | 6/2005 | Neault et al. | 43/131 |
| 6,910,300 B1 | 6/2005 | Warren | 43/131 |
| 6,981,680 B1 | 1/2006 | Gordon et al. | 248/346.01 |
| 7,165,354 B1 | 1/2007 | Rickenbacker | 43/131 |
| 7,213,869 B2 | 5/2007 | McClellan | 296/161 |
| 7,377,072 B2 | 5/2008 | Meier et al. | 43/131 |
| 7,513,476 B1 | 4/2009 | Huang | 248/469 |
| 7,634,894 B2 | 12/2009 | Yohe et al. | 53/447 |
| 7,647,723 B2 * | 1/2010 | Klein et al. | 43/132.1 |
| 7,669,363 B2 | 3/2010 | Frisch | 43/131 |
| 7,735,258 B2 * | 6/2010 | Vickery | 43/131 |
| 7,861,865 B2 * | 1/2011 | Green | 206/600 |
| 7,874,098 B2 * | 1/2011 | Vickery et al. | 43/131 |
| 7,874,436 B2 | 1/2011 | Vickery et al. | 43/131 |
| 8,028,468 B1 * | 10/2011 | Walsh et al. | 43/131 |
| 8,209,900 B2 * | 7/2012 | Vickery et al. | 43/131 |
| 2001/0040208 A1 | 11/2001 | Li | 248/519 |
| 2002/0043018 A1 | 4/2002 | Townsend | 43/131 |
| 2003/0038141 A1 | 2/2003 | Landsberger | 220/603 |
| 2003/0116569 A1 | 6/2003 | Mercier | 206/438 |
| 2004/0094558 A1 | 5/2004 | Najd | 220/603 |
| 2004/0181996 A1 | 9/2004 | Johnson et al. | 43/131 |
| 2004/0195250 A1 | 10/2004 | Fripps | 220/603 |
| 2004/0244274 A1 * | 12/2004 | Dellevigne et al. | 43/131 |
| 2005/0017148 A1 | 1/2005 | Tung | 248/346.01 |
| 2005/0028431 A1 | 2/2005 | Hoyes et al. | 43/131 |
| 2005/0097808 A1 | 5/2005 | Vorhies et al. | 43/61 |

(56) References Cited

U.S. PATENT DOCUMENTS

| | | | |
|---|---|---|---|
| 2005/0102887 A1 | 5/2005 | Lang et al. | 43/64 |
| 2005/0132637 A1 | 6/2005 | Deakins | 43/131 |
| 2005/0198893 A1 | 9/2005 | Bernard et al. | 43/131 |
| 2005/0235553 A1 | 10/2005 | Rail | 43/58 |
| 2006/0117644 A1 | 6/2006 | Hoyes et al. | 43/131 |
| 2006/0242890 A1* | 11/2006 | Ethan | 43/131 |
| 2006/0265944 A1 | 11/2006 | Meier et al. | 43/131 |
| 2008/0072475 A1 | 3/2008 | Nelson et al. | 43/131 |
| 2008/0196361 A1 | 8/2008 | Weimer | 53/473 |
| 2008/0302000 A1* | 12/2008 | Kidder | 43/131 |
| 2009/0056199 A1* | 3/2009 | Reed | 43/131 |
| 2009/0094884 A1 | 4/2009 | Cink | 43/131 |
| 2009/0139133 A1* | 6/2009 | Harper | 43/131 |
| 2009/0166235 A1 | 7/2009 | Månsson et al. | 206/391 |
| 2009/0229170 A1 | 9/2009 | Gaibotti | 43/131 |
| 2009/0307963 A1* | 12/2009 | Abbas | 43/131 |
| 2010/0031557 A1* | 2/2010 | Vickery et al. | 43/131 |
| 2010/0050498 A1 | 3/2010 | Nelson et al. | 43/60 |
| 2010/0251598 A1* | 10/2010 | Vickery | 43/58 |
| 2010/0313466 A1 | 12/2010 | Vickery | 43/131 |
| 2010/0325940 A1 | 12/2010 | Pryor et al. | 43/131 |
| 2011/0072709 A1 | 3/2011 | Patterson et al. | 43/131 |
| 2011/0179694 A1 | 7/2011 | Vickery et al. | 43/131 |
| 2011/0219666 A1* | 9/2011 | Vickery | 43/131 |

FOREIGN PATENT DOCUMENTS

| | | |
|---|---|---|
| EP | 0599755 | 6/1994 |
| EP | 745323 | 12/1996 |
| EP | 1201124 A2 | 5/2002 |
| EP | 1234502 A2 | 8/2002 |
| EP | 1350430 | 10/2003 |
| EP | 1459625 | 9/2004 |
| EP | 2100504 A2 | 9/2009 |
| EP | 2100504 A3 | 9/2010 |
| FR | 2 268 464 | 12/1975 |
| FR | 2 331 281 | 7/1977 |
| FR | 2 398 454 | 3/1979 |
| FR | 2 855 720 | 12/2004 |
| GB | 2 249 249 | 5/1992 |
| GB | 2 269 306 | 2/1994 |
| GB | 2 384 966 | 8/2003 |
| JP | 2009159938 | 7/2009 |
| WO | WO 98/10645 | 3/1998 |
| WO | WO 99/03340 | 1/1999 |
| WO | WO 01/37651 | 5/2001 |
| WO | WO 02/13604 | 2/2002 |
| WO | WO 02/102147 | 12/2002 |
| WO | WO 03/009683 | 2/2003 |
| WO | WO 03/045138 | 6/2003 |
| WO | WO 2004/084625 | 10/2004 |
| WO | WO 2005/006857 | 1/2005 |
| WO | WO 2007/147550 | 12/2007 |
| WO | WO 2008/035304 | 3/2008 |
| WO | WO 2010/017306 | 2/2010 |
| WO | WO 2010/033908 | 3/2010 |
| WO | WO 2010/151730 | 12/2010 |

OTHER PUBLICATIONS

Morris et al., "Comparative evaluation of tamper-proof mouse bait station," *Proceedings of the Thirteenth Vertebrate Pest Conference*, 1988.
Notice of Allowance issued in U.S. Appl. No. 12/186,436, dated Sep. 15, 2010.
Notice of Allowance, issued in U.S. Appl. No. 10/550,378, mailed Mar. 16, 2010.
Notice to Manufacturers, Formulators Registrants and Users of Pesticides, United States Environmental Protection Agency, Washington D.C., Sep. 16, 1994.
Office Action issued in U.S. Appl. No. 13/013,665, dated Aug. 29, 2011.
Office Action, issued in U.S. Appl. No. 10/550,378, mailed Aug. 21, 2007.
Office Action, issued in U.S. Appl. No. 10/550,378, mailed Dec. 28, 2007.
Office Action, issued in U.S. Appl. No. 10/550,378, mailed Sep. 19, 2008.
Office Action, issued in U.S. Appl. No. 10/550,378, mailed Feb. 18, 2009.
Office Action, issued in U.S. Appl. No. 10/550,378, mailed Jul. 8, 2009.
Office Action, issued in U.S. Appl. No. 10/550,378, mailed Nov. 12, 2009.
Office Action, issued in U.S. Appl. No. 11/786,355, mailed Jul. 14, 2009.
Office Action, issued in U.S. Appl. No. 11/786,355, mailed Jan. 19, 2010.
Office Action, issued in U.S. Appl. No. 11/786,355, mailed Aug. 18, 2010.
Office Action, issued in U.S. Appl. No. 11/786,355, mailed Apr. 15, 2011.
Office Action, issued in U.S. Appl. No. 12/816,300, dated Aug. 25, 2011.
Office Action, issued in U.S. Appl. No. 12/816,306, dated Jun. 28, 2011.
Office Action, issued in U.S. Appl. No. 12/816,306, dated Sep. 30, 2010.
Office Action, issued in U.S. Appl. No. 12/816,315, mailed Sep. 30, 2010.
Office Action, issued in U.S. Appl. No. 12/816,315, mailed Jun. 15, 2011.
PCT International Search Report and Written Opinion, issued in International Application No. PCT/2009/052868, mailed Apr. 28, 2010.
PCT International Search Report, issued in International application No. PCT/US2009/056246, mailed Jun. 25, 2010.
PCT Invitation to Pay Additional Fees, in Int. App. No. PCT/US2009/052868, mailed Mar. 4, 2010.
Response to Office Action, issued in U.S. Appl. No. 12/816,315, dated Mar. 30, 2011.
Response to Office Action, issued in U.S. Appl. No. 12/816,306, dated Mar. 30, 2011.
Response to Office Action, submitted in U.S. Appl. No. 10/550,378, dated Jun. 27, 2008.
Response to Office Action, submitted in U.S. Appl. No. 10/550,378, dated Dec. 9, 2008.
Response to Office Action, submitted in U.S. Appl. No. 10/550,378, dated May 13, 2009.
Response to Office Action, submitted in U.S. Appl. No. 10/550,378, dated Aug. 26, 2009.
Response to Office Action, submitted in U.S. Appl. No. 10/550,378, dated Feb. 12, 2010.
Response to Office Action, submitted in U.S. Appl. No. 10/550,378, dated Oct. 22, 2007.
Response to Office Action, submitted in U.S. Appl. No. 11/786,355, dated Nov. 16, 2009.
Response to Office Action, submitted in U.S. Appl. No. 11/786,355, dated May 24, 2010.
Response to Office Action, submitted in U.S. Appl. No. 13/013,665, dated Feb. 29, 2012.
Spun et al., "Bait station preferences of Norway rats," *Doc Research & Development Series* 255, 2006.
Supplemental Response to Office Action, submitted in U.S. Appl. No. 10/550,378, dated May 13, 2009.

* cited by examiner

WEIGHTED RODENT BAIT STATIONS AND RELATED METHODS

CROSS REFERENCES TO RELATED APPLICATIONS

This application is a national phase application under 35 U.S.C. §371 of International Application No. PCT/US2009/056246 filed Sep. 8, 2009, which claims priority to U.S. Provisional Patent Application No. 61/095,251, filed Sep. 8, 2008 both of which are incorporated by reference in their entireties.

BACKGROUND

The present methods, devices, and systems relate generally to the field of rodent bait stations.

SUMMARY

Some embodiments of the present rodent bait station assemblies have a bait station integrally fixed to an anchoring base. The anchoring base may include a base weight component contained within a base outer component.

In of these embodiments, the base weight component comprises a weight material, the base outer component comprises a base outer material, and the weight material and the base outer material are not the same.

In some embodiments of the present rodent bait station assemblies, the base outer material is plastic. In some embodiments, the bait station comprises a bait station material that is the same as the base outer material, which may be, for example, plastic.

Some embodiments of the rodent bait station assembly have a base weight component that is not removable from the anchoring base. In some embodiments, the base weight component is entirely encased within the base outer component such that the base weight is not exposed.

In some embodiments, the anchoring base is integrally fixed to the bait station without the use of attaching hardware or adhesives.

In some embodiments of the present rodent bait station assemblies, the anchoring base weight may comprise ceramic, concrete, iron, gravel, sand, or water. Some embodiments include bait stations that are configured with a lid. Some of these embodiments include a removable key, and are configured such that the lid can be unlocked from the bait station using the key.

Some embodiments of the present rodent bait station assemblies have a base portion and a lid that is integrally attached to the base portion. Some of these embodiments include a removable key, and are configured such that the lid can be unlocked from the bait station using the key.

Some embodiments of the present rodent bait station assemblies contain bait located within the bait station. Some of these embodiments also include bait-holding rods that couple the bait to the bait station.

In some embodiments of the present rodent bait station assemblies, projecting the outer perimeter of the anchoring base onto the plane of the lower surface of the anchoring base circumscribes an area that is about 110% or less than the area circumscribed by projecting the outer perimeter of the bait station onto the same plane.

In some embodiments of the present rodent bait station assemblies, the shape resulting from projecting the outer perimeter of the anchoring base onto the plane of the lower surface of the anchoring base is substantially the same as the shape resulting from projecting the outer perimeter of the bait station onto the same plane. The term "substantially the same" in this respect means that the two shapes can be aligned such that the offset between the two shapes (e.g., for any given point on either shape, the shortest distance to a point on the other shape) does not deviate by more then 10% from the median offset between the two shapes.

Embodiments of the present rodent bait station packaged bundle contain a packaging container and a bait station assembly having a bait station fixed to an anchoring base. In these embodiments, the bait station assembly may be within the packaging container.

Some embodiments of the present rodent bait station packaged bundle include bait located within the bait station. In some of these embodiments, the bait is coupled to the bait station using bait-holding rods.

In some embodiments of the present rodent bait station packaged bundle, the packaging container is paper. Some embodiments of the packaging container are paperboard, corrugated fiberboard, or plastic.

Embodiments of the present shipping bundles include a transport pallet, rodent bait station assemblies, and a plastic film wrapped around a portion of the plurality of rodent bait station assemblies to secure the rodent bait station assemblies to the transport pallet and restrict movement of rodent bait station assemblies relative to each other.

Some embodiments of the present shipping bundles include bait located within the bait station. In some of these embodiments, bait-holding rods couple the bait to the bait station.

Some embodiments of the present shipping bundles include a strap securing the rodent bait station assemblies to the transport pallet.

Embodiments of the present methods for bundling a plurality of rodent bait station assemblies includes the steps of placing a plurality of rodent bait station assemblies on a transport pallet, and wrapping a plastic film around a portion of the plurality of rodent bait station assemblies to secure the rodent bait station assemblies to the transport pallet and restrict movement of rodent bait station assemblies relative to each other. In these embodiments each rodent bait station assembly may include a bait station fixed to an anchoring base.

Any embodiment of any of the present methods, devices, and systems may consist of or consist essentially of—rather than comprise/include/contain/have—the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. Identical reference numerals do not necessarily indicate an identical structure, system, or display. Rather, the same reference numeral may be used to indicate a similar feature or a feature with similar functionality. Every feature of each embodiment is not always labeled in every figure in which that embodiment appears, in order to keep the figures clear. FIGS. 1, 3, and 4 are drawn to scale, meaning the sizes of the depicted elements are accurate relative to each other.

DESCRIPTION OF ILLUSTRATIVE EMBODIMENTS

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, a method comprising certain steps is a method that includes at least the recited steps, but is not limited to only possessing the recited steps. Likewise, a device or system comprising certain elements includes at least the recited elements, but is not limited to only possessing the recited elements.

The terms "a" and "an" are defined as one or more than one, unless this disclosure expressly requires otherwise. The term "another" is defined as at least a second or more.

In one aspect, the present disclosure provides embodiments that are rodent bait station assemblies. In another aspect, the present disclosure provides embodiments that are rodent bait station packaged bundles that include embodiments of the rodent bait station assemblies. Another aspect of the present disclosure provides shipping bundles that include a plurality of embodiments of the rodent bait station assemblies. Yet another aspect of the present disclosure provides methods for bundling rodent bait station assemblies.

Embodiments of the present rodent bait station assemblies are depicted in FIGS. 1-4. Rodent bait station assembly 10 includes bait station 100 integrally fixed to anchoring base 200. As used herein, "integrally fixed" denotes that the components are fixed in a non-separable manner, including, for example, fabricated as a unitary piece. Anchoring base 200 provides rodent bait station assembly 10 with additional stability compared to an implementation having bait station 100 alone. Bait station 100 is typically formed from plastic (through, for example, injection molding techniques), but may alternately be fabricated from other materials or combinations of materials. Anchoring base 200 may be very heavy relative to bait station 100, and may include base weight component 220 contained within base outer component 210. Base outer component 210 is typically formed from the same material as bait station 100, and may be fabricated along with bait station 100 as a unitary piece, thereby eliminating the need for joining base outer component 210 and bait station 100 with attaching hardware or adhesives. Such a unitary piece can be formed using a fabrication process such as, for example, injection molding.

Figure 1:
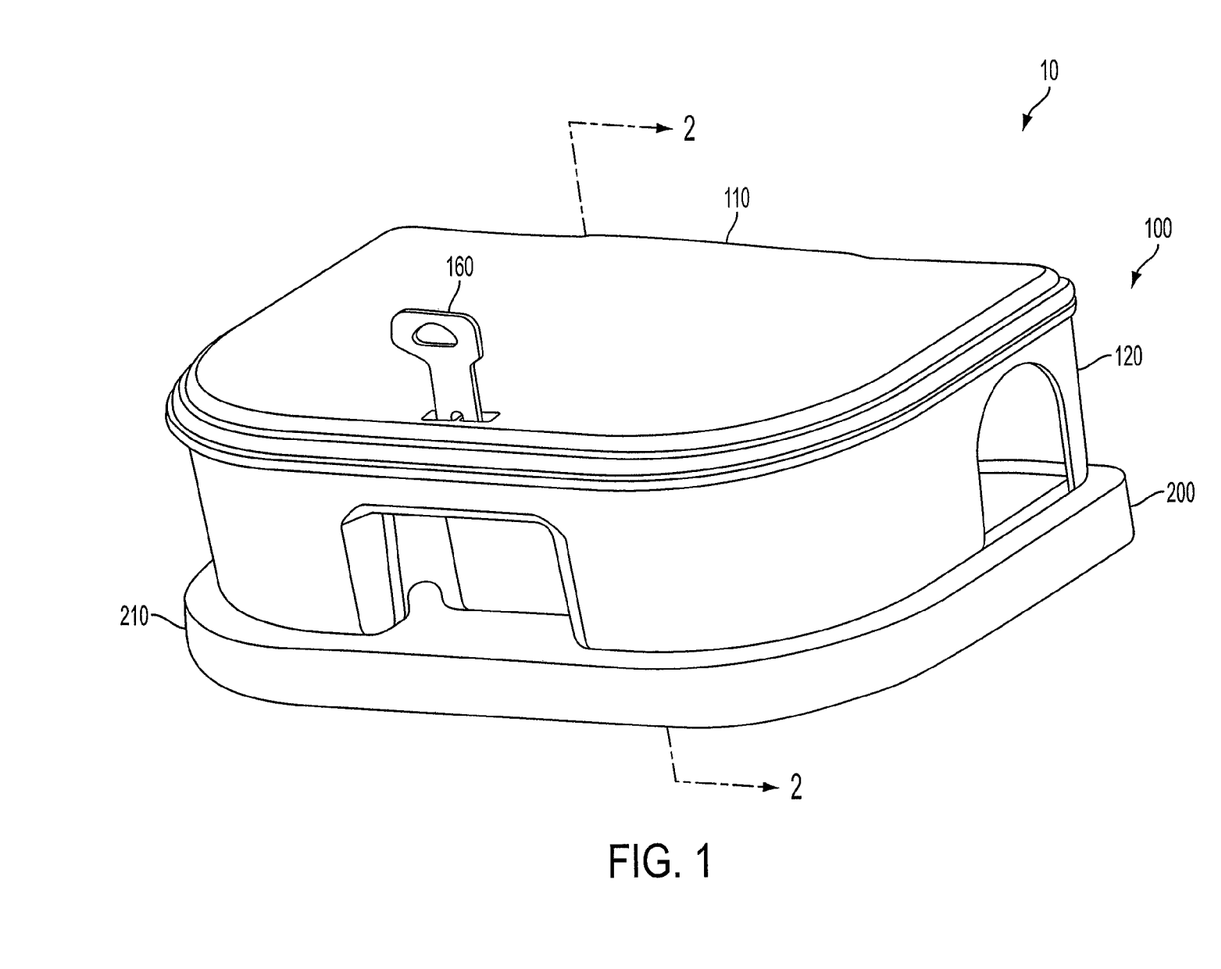
FIG. 1 depicts a perspective view of an embodiment of the present rodent bait station assemblies.
Figure 2:
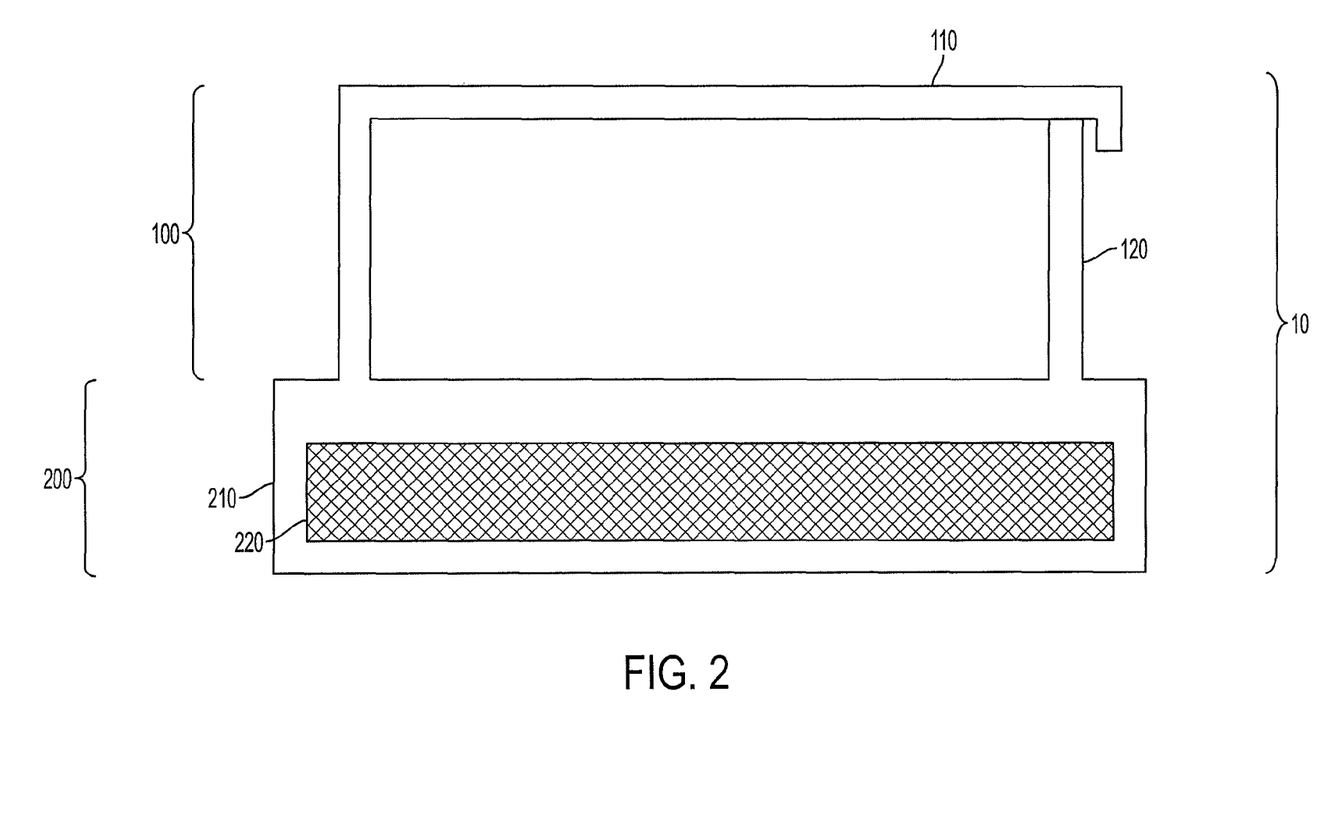
FIG. 2 is a cross-sectional view of the embodiment depicted in FIG. 1, taken along line 2-2.

Base weight component 220 may be fabricated from materials such as concrete. The concrete may be formed using a vertical mixer that drops a shot of concrete into a form that is then shaken to achieve the desired shape, after which multiple bases weight components can be cured together using any suitable technique. An example of suitable concrete for making base weight component 220 can be created using a 5 sack mix that yields about 4000 psi (pounds per square inch) concrete; the amount of water in the mix can be minimized and any resulting slump also kept to a minimum. Soap in the form of an admixture may also be added, such as those that are available from Grace Construction Products. Base weight components formed from such concrete may be cured by enclosing them, such as with a tarp (e.g., a 3 millimeter thick plastic sheet), and allowing the cure temperature in or around the bases to reach about 105 to about 135 degrees F. (Fahrenheit).

Other embodiments of base weight component 220 may be fabricated from ceramic, rubber, plastic, wood, stone, metal (e.g., iron), or another suitable material or combination of materials. The additional weight provided by base weight component 220 of base 200 reduces the likelihood that rodent bait station assembly 10 will be unintentionally moved or tipped, compared to a bait station alone.

Anchoring base 200 may be configured with base weight component 220 that is not removable from base outer component 210. In some embodiments, base weight component 220 may be entirely encased within base outer component 210, such that base weight component 220 is not exposed. These embodiments may be formed using a fabrication process such as, for example, overmolding.

In some other embodiments, anchoring base 200 may be configured to be filled with base weight component 220 after anchoring base 200 is formed. Some of these embodiments may include base weight component 220 that is economical and suitable for filling through an orifice, such as, for example, water, sand, or gravel.

Figure 3:
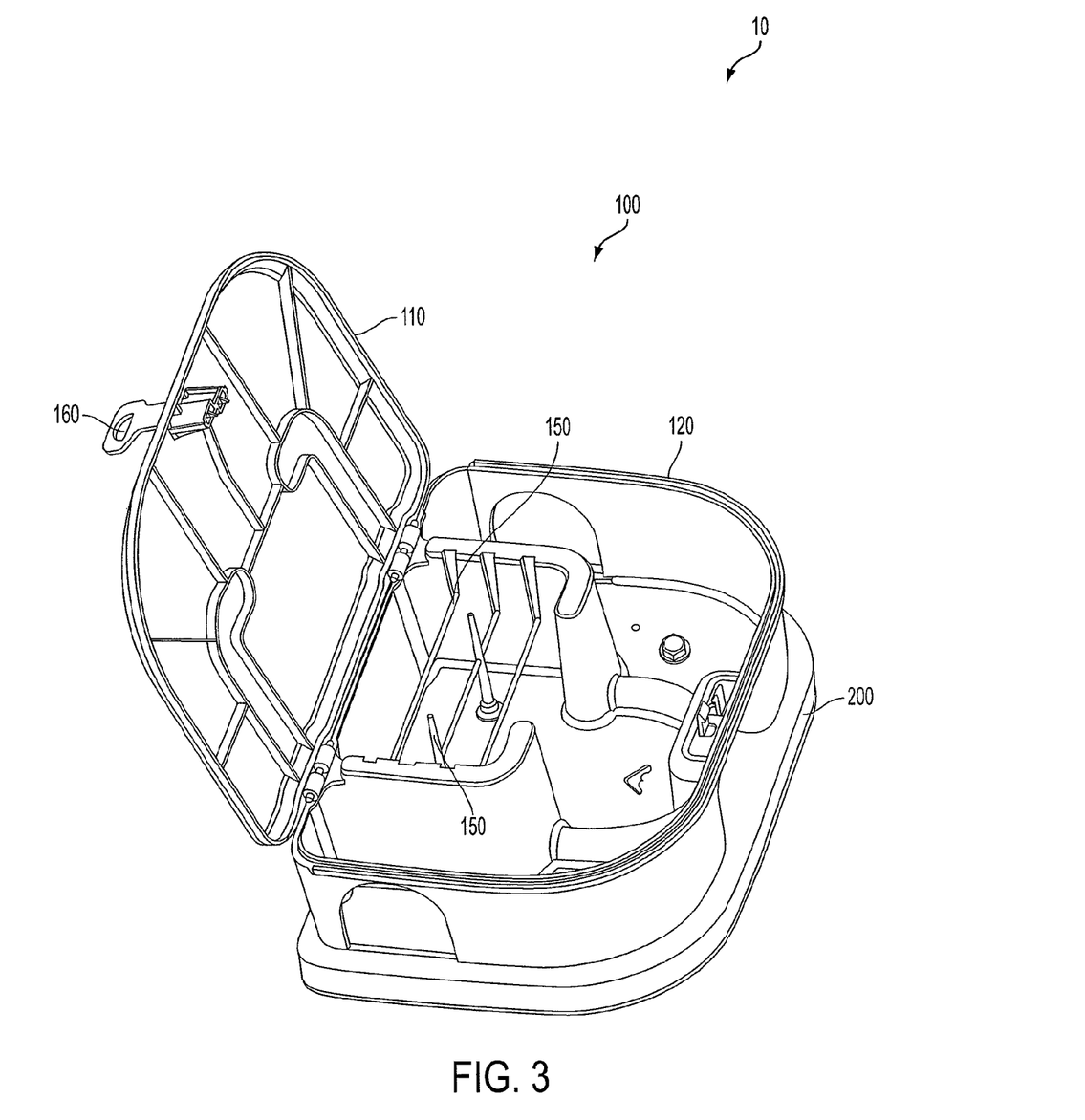
FIGS. 3 and 4 illustrate the interior of embodiments of the present bait stations. Bait and bait-holding rods are depicted.
Figure 4:
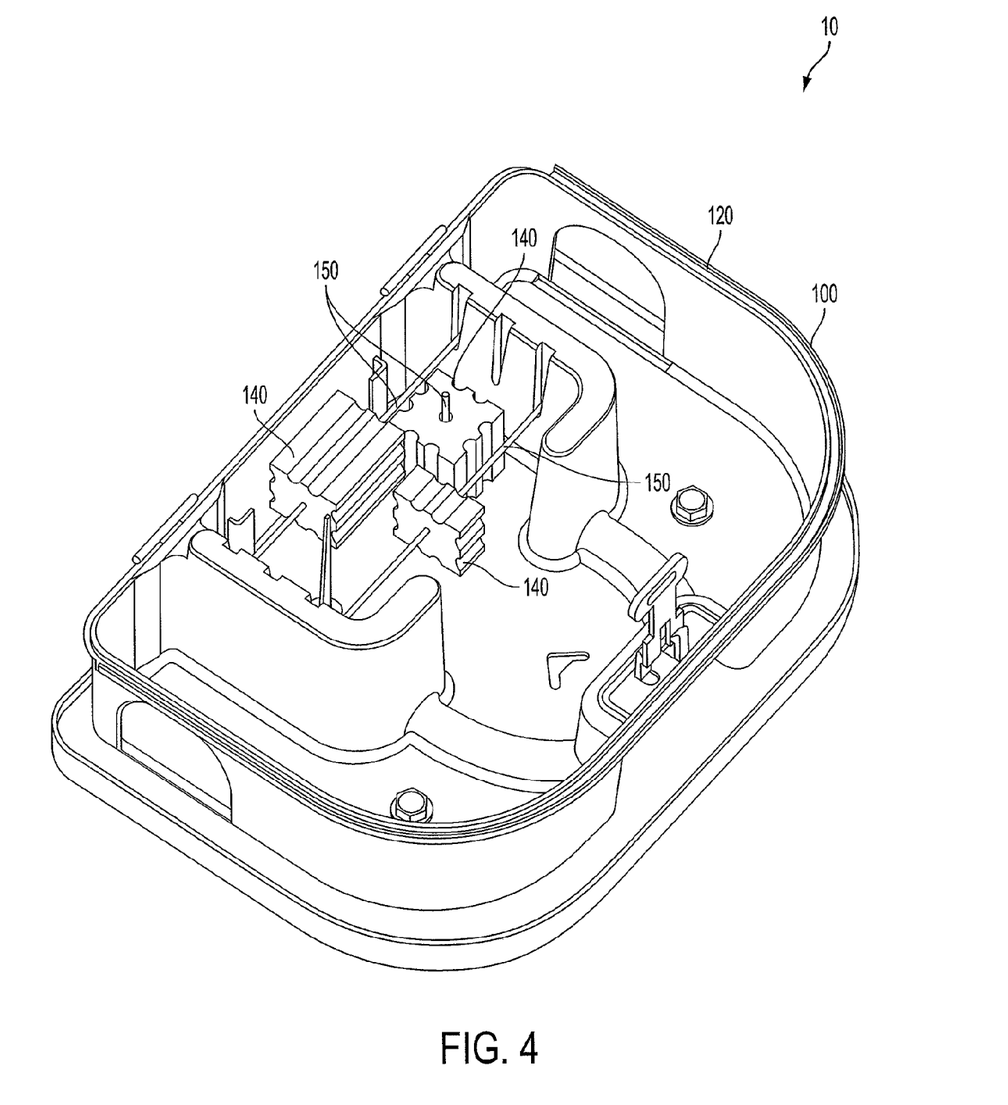

Bait station 100 may include lid 110 and base 120. The lid and base may be integral with each other, and include a "living" hinge, or they may be separate pieces that can be coupled together. Some embodiments include key 160, and are configured to lock lid 110 to base 120 in a closed position to restrict access to bait 140 within bait station 100. Some embodiments are configured such that lid 110 can be unlocked from bait station 100 using the key.

Referring to FIGS. 1, 3, and 4, some embodiments of anchoring base 200 and bait station 100 may have substantially the same shape. In this respect, the shape resulting from projecting the outer perimeter of anchoring base 200 onto the plane of anchoring base top surface 210 may be substantially the same as the shape resulting from projecting the outer perimeter of the bait station 200 onto the same plane.

In some embodiments, projecting the outer perimeter of anchoring base 200 onto the plane of the bottom surface of anchoring base 200 circumscribes an area that is about 150% or less of the area circumscribed by projecting the outer perimeter of bait station 200 onto the same plane. For example, the projection of the perimeter of anchoring base 200 onto the plane of the bottom surface of anchoring base 200 may circumscribe an area that is equal or less than 100, 101, 102, 103, 104, 105, 106, 107, 108, 109, 110, 111, 112, 113, 114, 115, 120, 125, 130, 135, 140, 145, or 150 percent of the area circumscribed by the projection of the perimeter of bait station 100 onto the same plane.

Referring to FIGS. 3 and 4, bait 140 may be held in place within bait station 100 by bait-holding rods 150, which may be constrained within bait station 100 by physical means such as, for example, slots configured to constrain holding rods 150. One of ordinary skill in the art will appreciate that other methods of constraining bait 140 may be used in other embodiments of the present disclosure.

Figure 5:
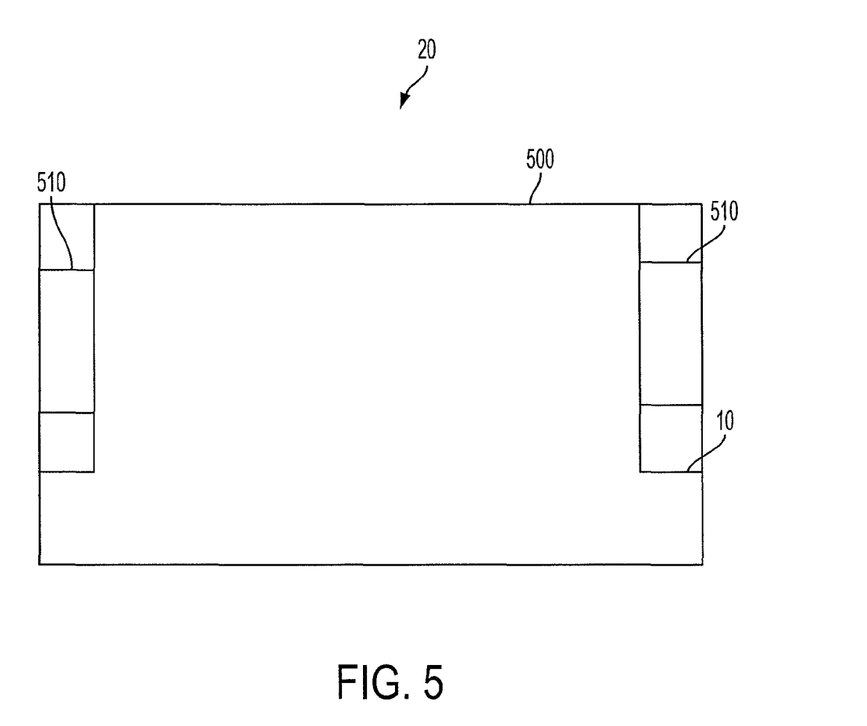
FIG. 5 depicts an embodiment of a present rodent bait station packaged bundle, having an embodiment of a rodent bait station assembly (depicted generically) packaged within a packaging container.

An embodiment of the present rodent bait station packaged bundles is depicted in FIG. 5. In this embodiment rodent bait station packaged bundle 20 includes rodent bait station assembly 10 contained within packaging container 500.

Packaging container 500 may be fabricated using paper, such as paperboard (e.g., non-corrugated boxes), corrugated fiberboard (e.g., corrugated cardboard boxes), plastic (e.g., plastic packaging), or any other suitable packaging material. Embodiments of packaging container 500 may include a combination of materials (e.g., blister packs that include formed plastic as well as paperboard). Some embodiments of rodent bait station packaged bundle 20 may include packaging container 500 that is a shrink-wrap plastic film. Packing material 510 may also be included within packaging container 500 to protect rodent bait station assembly 10 from possible damage incurred during shipping. Examples of packing material 510 include bubble wrap and polystyrene foam.

Figure 6:
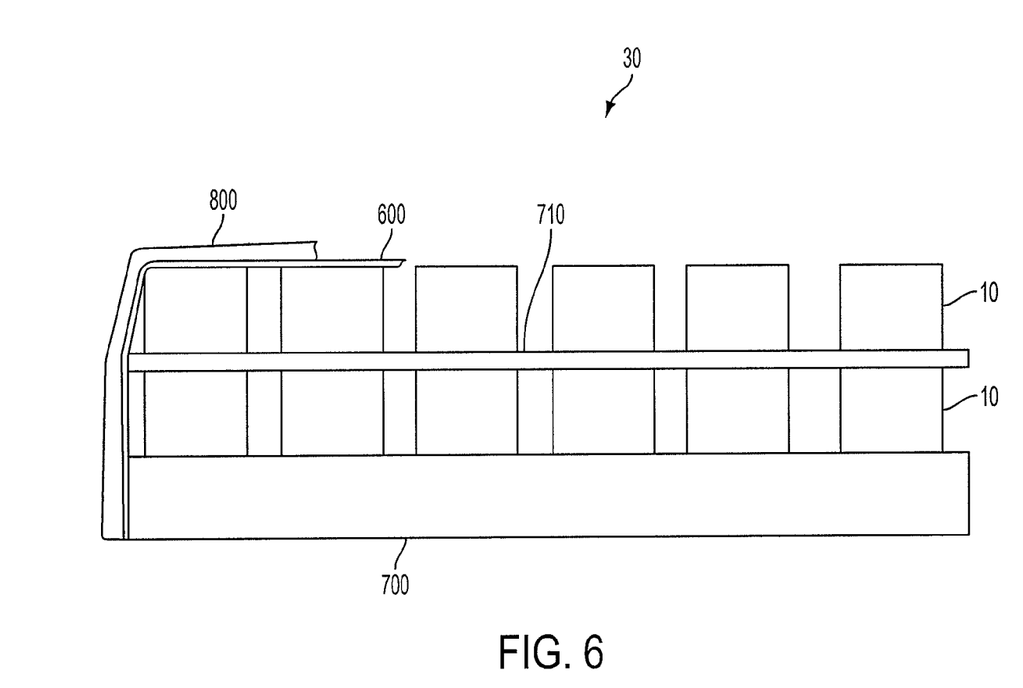
FIG. 6 depicts an embodiment of a present shipping bundle, having a plurality of present rodent bait station packaged bundles on a transport pallet.

An embodiment of the present shipping bundle 30 is depicted in FIG. 6. In this embodiment, several rodent bait station assemblies 10 (depicted generically) are positioned on transport pallet 700. Multiple rows of rodent bait station assembly 10 may be positioned on transport pallet 700, and layer stacking material 710 may be used as a separator between the individual rows of rodent bait station assemblies 10. Transport pallet 700 may be a wooden pallet, a plastic pallet, or any other suitable pallet or skid that can be used to aid in shipping large numbers of products such as rodent bait station assemblies 10. The individual rodent bait station assemblies 10 that are part of shipping bundle 30 may or may not be individually packaged within rodent bait station packaged bundles 20. In some embodiments of shipping bundle 30, plastic film 600 and/or strap 800 may be used to tie down the individual rodent bait station assemblies 10 to transport pallet 700, so as to restrict the movement of individual rodent bait station assemblies 10 relative to each other. Furthermore, bundle 30 may include a film that is wrapped around multiple groups of assemblies that have been wrapped together with a similar film, thus creating a large bundle comprising multiple smaller bundles that each comprise multiple assemblies 10. For example, in some embodiments, bundle 30 comprises 240 total assemblies 10 wrapped with a film and grouped as follows: four stacked (one on top of the other) smaller bundles that each includes a pallet (e.g., 40 inches by 48 inches) on which four stacked layers of 15 assemblies 10 each have been positioned and wrapped with a film, where two of the smaller bundles that are stacked and that each comprises 60 assemblies have also been wrapped with a film to form an intermediate bundle, and the two intermediate bundles are stacked on each other to form the embodiment of bundle 30 that comprises the 240 total assemblies 10.

Figure 7:
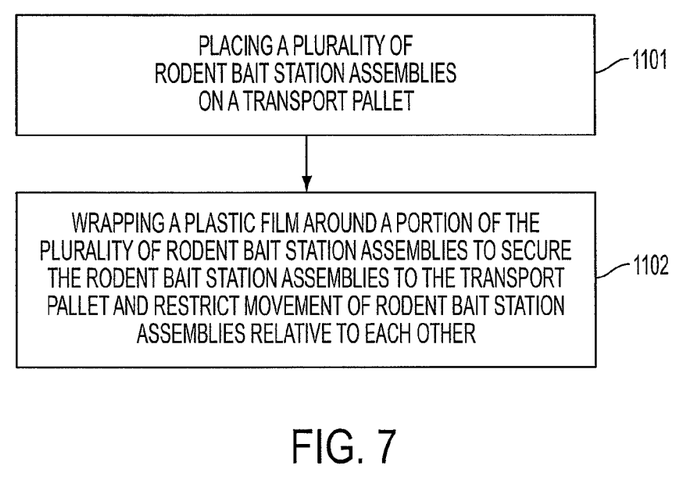
FIG. 7 is a flow chart showing an embodiment of a method for bundling a plurality of rodent bait station assembly.

FIG. 7 presents a flow chart of the steps involved in an embodiment of the present method for bundling a plurality of rodent bait station assemblies for shipment. This embodiment includes placing a plurality of rodent bait station assemblies (e.g., rodent bait station assembly 10) on a transport pallet (e.g., transport pallet 700) (step 1101) and wrapping a plastic film (e.g., plastic film 600) around a portion of the plurality of rodent bait station assemblies to secure the rodent bait station assemblies to the transport pallet and restrict movement of rodent bait station assemblies relative to each other (step 1102). Such wrapping may be accomplished using, for example, a conventional stretch wrap machine.

Descriptions of well known assembly techniques, components, and equipment have been omitted so as not to unnecessarily obscure the present methods, apparatuses, an systems in unnecessary detail. The descriptions of the present methods and apparatuses are exemplary and non-limiting. Certain substitutions, modifications, additions and/or rearrangements falling within the scope of the claims, but not explicitly listed in this disclosure, may become apparent to those of ordinary skill in the art based on this disclosure. For example, some embodiments may use base weight component 220 that is not entirely en cased within base outer component 210. Some embodiments may include bait station 100 that is integrally fixed to anchoring base 200 by use of permanent attaching hardware of adhesives.

The appended claims are not to be interpreted as including means-plus-function limitations, unless such a limitation is explicitly recited in a given claim using the phrase(s) "means for" and/or "step for," respectively.

The invention claimed is:
1. A rodent bait station assembly having:
a bait station; and
an anchoring base integrally fixed to the bait station, the anchoring base comprising a base weight component contained within a base outer component.
2. The rodent bait station assembly of claim 1, where:
the base weight component comprises a weight material;
the base outer component comprises a base outer material; and
the weight material and the base outer material are not the same.
3. The rodent bait station assembly of claim 2, where the base outer material is plastic.
4. The rodent bait station assembly of claim 2, where the bait station comprises a bait station material that is the same as the base outer material.
5. The rodent bait station assembly of claim 4, where the base outer material and the bait station material are plastic.
6. The rodent bait station assembly of claim 1, where the base weight component is entirely encased within the base outer component.
7. The rodent bait station assembly of claim 1, where the anchoring base is integrally fixed to the bait station without the use of attaching hardware or adhesives.
8. The rodent bait station assembly of claim 7, where the base outer component and the bait station are fabricated as a unitary piece.
9. The rodent bait station assembly of claim 1, where the anchoring base is configured such that the base weight component is not removable from the anchoring base.
10. The rodent bait station assembly of claim 9, where:
the base weight component comprises a weight material;
the base outer component comprises a base outer material; and
the weight material and the base outer material are not the same.
11. A rodent bait station assembly having:
a bait station; and
an anchoring base integrally fixed to the bait station, the anchoring base comprising:
a base outer component comprising a base outer material; and
a base weight component contained within a base outer component, the base weight component comprising a weight material;
where:
the weight material and the base outer material are not the same; and
the anchoring base is integrally fixed to the bait station without the use of attaching hardware or adhesives.
12. The rodent bait station assembly of claim 11, where the base outer material is plastic.
13. The rodent bait station assembly of claim 11, where the anchoring base is configured such that the base weight component is not removable from the anchoring base.

14. The rodent bait station assembly of claim 13, where the bait station comprises a bait station material that is the same as the base outer material.

15. The rodent bait station assembly of claim 14, where the base weight component is entirely encased within the base outer component.

16. The rodent bait station assembly of claim 15, where the base outer material and the bait station material are plastic.

17. The rodent bait station assembly of claim 16, where the base outer component consists essentially of the base outer material.

18. The rodent bait station assembly of claim 17, where the base weight component consists essentially of the weight material.

19. The rodent bait station assembly of claim 18, where the base outer component and the bait station are fabricated as a unitary piece.

20. A rodent bait station packaged bundle comprising:
a packaging container; and
a bait station assembly comprising a bait station integrally fixed to an anchoring base;
where the bait station assembly is within the packaging container.

\* \* \* \* \*

UNITED STATES PATENT AND TRADEMARK OFFICE
CERTIFICATE OF CORRECTION

PATENT NO. : 8,701,594 B2  Page 1 of 1
APPLICATION NO. : 13/062915
DATED : April 22, 2014
INVENTOR(S) : Vickery et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 90 days.

Signed and Sealed this

Twenty-ninth Day of September, 2015

Michelle K. Lee
*Director of the United States Patent and Trademark Office*